(12) United States Patent
Glück et al.

(10) Patent No.: US 12,459,754 B2
(45) Date of Patent: Nov. 4, 2025

(54) HANDLING DEVICE FOR A TRANSFER OF PRODUCTS, PRODUCTION MACHINE WITH SUCH A HANDLING DEVICE AND METHOD FOR A TRANSFER OF PRODUCTS

(71) Applicant: Syntegon Packaging Technology GmbH, Remshalden (DE)

(72) Inventors: Raphael Glück, Berglen (DE); Sebastian Schwarz, Neusitz (DE); Roland Kuhn, Urbach (DE); Manuel Wied, Korb (DE)

(73) Assignee: Syntegon Packaging Technology GmbH, Remshalden (DE)

( * ) Notice: Subject to any disclaimer, the term of this patent is extended or adjusted under 35 U.S.C. 154(b) by 364 days.

(21) Appl. No.: 18/188,269

(22) Filed: Mar. 22, 2023

(65) Prior Publication Data
US 2023/0303340 A1    Sep. 28, 2023

(30) Foreign Application Priority Data
Mar. 25, 2022  (DE) ..................... 10 2022 107 117.0

(51) Int. Cl.
*B65G 47/57*   (2006.01)
*B65G 54/02*   (2006.01)

(52) U.S. Cl.
CPC ............. *B65G 47/57* (2013.01); *B65G 54/02* (2013.01); *B65G 2201/0202* (2013.01)

(58) Field of Classification Search
CPC . B65G 47/57; B65G 54/02; B65G 2201/0202
See application file for complete search history.

(56) References Cited

U.S. PATENT DOCUMENTS 7,708,135 B2   5/2010  Ellerth et al.
9,169,083 B2 * 10/2015  Huff .................. B65G 65/00
(Continued)

FOREIGN PATENT DOCUMENTS

AT            523810 A1    11/2021
DE      102008039764 A      5/2010
(Continued)

OTHER PUBLICATIONS

European Patent Office Search Report for Application No. 23164079.8 dated Aug. 11, 2023 (17 pages, English translation included).
(Continued)

*Primary Examiner* — Gene O Crawford
*Assistant Examiner* — Keith R Campbell
(74) *Attorney, Agent, or Firm* — Michael Best & Friedrich LLP

(57) ABSTRACT

A handling device for a transfer of products, in particular food products, includes at least one transport unit, in particular a conveyor belt unit, with at least one electrodynamic conveying unit comprising at least one electrodynamically movable mover and at least one product receiving unit, which is arranged at the mover and has at least one sidewall extending transversally to a support surface of the product receiving unit and at least partially delimiting a product receiving space of the product receiving unit, and including at least one transfer unit for a product transfer of products between the transport unit and the mover, wherein viewed in a plane extending at least substantially perpendicularly to a main extension plane of the product receiving unit, the product receiving unit has at least one front face that is at least partially open.

13 Claims, 7 Drawing Sheets

(56) References Cited

U.S. PATENT DOCUMENTS

2013/0062160 A1   3/2013   Steinbach et al.
2016/0256896 A1   9/2016   Madar et al.
2017/0050332 A1   2/2017   Bauer et al.
2021/0336522 A1   10/2021  Flixeder et al.
2024/0158179 A1*  5/2024   Bialy .................... B65G 15/46

FOREIGN PATENT DOCUMENTS

DE   102014106400 A1   11/2015
DE   102014116232 A1   5/2016
DE   102018218666 A1   4/2020
EP       0496046 A1    7/1992
EP       3533733 A1    9/2019

OTHER PUBLICATIONS

German Patent Office Action for Application No. 102022107117.0 dated Nov. 5, 2024 (7 pages including English machine translation).
German Patent Office Action for Related Application No. 102022107117.0 dated Nov. 30, 2022 (9 pages, including an English translation).
Planar Motor Inc., "Planar Motor" Website—Product Handling/Transfer Device, website available at least as early as Mar. 25, 2022 <https://www.planarmotor.com/en> (5 pages).
European Patent Office Action for Application No. 23164079.8 dated Feb. 5, 2025 (14 pages including English machine translation).

* cited by examiner

US 12,459,754 B2

HANDLING DEVICE FOR A TRANSFER OF PRODUCTS, PRODUCTION MACHINE WITH SUCH A HANDLING DEVICE AND METHOD FOR A TRANSFER OF PRODUCTS

CROSS REFERENCE TO RELATED APPLICATION

This application is based on and incorporates herein by reference the German patent application DE 102022 107 117.0, which was filed on Mar. 25, 2022.

BACKGROUND

The invention concerns a handling device for a transfer of products, with at least one transport unit, with at least one electrodynamic conveying unit comprising at least one electrodynamically movable mover and at least one product receiving unit which is arranged at the mover and has at least one side wall extending transversally to a support surface of the product receiving unit and at least partially delimiting a product receiving space of the product receiving unit, and with at least one transfer unit for a product transfer of products between the transport unit and the mover.

From the company Planar Motor Inc., a handling device for a transfer of products is already known, which comprises at least one transport unit and an electrodynamic conveying unit, the conveying unit comprising at least one electrodynamically movable mover and at least one product receiving unit which is arranged at the mover, the product receiving unit having at least one side wall which extends transversally to a support surface of the product receiving unit and at least partially delimits a product receiving space of the product receiving unit. The already known handling device of the company Planar Motors Inc. further comprises a transfer unit for a product transfer of products between the transport unit and the mover. For a transport of products to the mover, the transfer unit comprises a ramp, and for a transport from the mover to a downstream transport belt or a buffer station, the transfer unit comprises a gripper.

The invention provides a generic device and a generic method with improved properties regarding a flexibility within a transport process.

SUMMARY

The invention is based on a handling device for a transfer of products, in particular food products, with at least one transport unit, in particular a conveyor belt unit, with at least one electrodynamic conveying unit comprising at least one electrodynamically movable mover and at least one product receiving unit, which is arranged at the mover and has at least one sidewall extending transversally to a support surface of the product receiving unit and at least partially delimiting a product receiving space of the product receiving unit, and with at least one transfer unit for a product transfer of products between the transport unit and the mover.

It is proposed that, viewed in a plane extending at least substantially perpendicularly to a main extension plane of the product receiving unit, the product receiving unit has at least one front face that is at least partially open. The implementation according to the invention advantageously allows realizing secure arrangement of a product in the product receiving unit, the product being at the same time easily removable out of the product receiving unit. Advantageously, removal of a product from the product receiving unit is advantageously realizable by a movement of the mover alone, in particular caused by the mover passing at least partially under a ramp-shaped transfer element or by a braking process of the mover. Advantageously, in particular in at least one exemplary embodiment of the handling device, a constructionally simple removal of a product out of the product receiving unit is realizable with a driveless transfer unit, in particular with a ramp-shaped transfer element. Advantageously, in particular in at least one exemplary embodiment of the handling device, removal of a product is realizable by a delay of the mover, such that it is advantageously possible to dispense with additional removal devices, like for example removal grippers or the like.

The front face of the product receiving unit may be implemented in an at least partially open fashion in particular by the product receiving unit having at the front face a breakthrough in a sidewall, by the product receiving unit being at the front face realized free of a side wall, by the product receiving unit having at the front face a movably supported sidewall that can be opened and closed due to its movable support, or by other implementations of the product receiving unit which are deemed expedient by someone skilled in the art. The main extension plane of the product receiving unit preferably extends at least substantially parallel to the support surface of the product receiving unit. The main extension plane of the product receiving unit preferentially extends at least substantially parallel to a main movement plane of the mover, movement axes of the mover, along which and/or around which the mover is movable relative to the movement plane elements, extending in said main movement plane of the mover. "Substantially parallel" is in particular to mean an orientation of a direction relative to a reference direction, in particular in a plane, the direction having a deviation from the reference direction that is in particular smaller than 8°, advantageously smaller than 5° and especially advantageously smaller than 2°.

Preferentially the transport unit is configured for a transport of products. Preferably the transport unit is configured for a feeding of products to the transfer unit and/or for a transport of products away from the transport unit. "Configured" is in particular to mean specifically furnished, specifically programmed, specifically designed and/or specifically equipped. By an object being configured for a certain function is in particular to be understood that the object fulfills and/or executes said certain function in at least one application state and/or operation state. The transport unit preferably comprises at least one feed transport element, in particular a feed transport belt, for a feeding of products to the transfer unit, and at least one transport-away element, in particular a transport-away conveyor belt. Preferably the feed transport element forms a transport section of the transport unit. Preferentially the transport-away element forms a further transport section of the transport unit. Preferably, viewed along a main transport direction of the transport unit, the electrodynamic conveying unit and the transfer unit are arranged between at least two transport sections of the transport unit. In particular, viewed along the main transport direction of the transport unit, the electrodynamic conveying unit and the transfer unit are arranged between the feed transport element and the transport-away element. However, it is also conceivable that the electrodynamic conveying unit and the transfer unit are arranged in a different position with respect to the transport sections, deemed expedient by someone skilled in the art.

The transfer unit is preferably configured for a transfer of products from the transport unit, in particular the feed transport element, to the mover and/or for a transfer of products from the mover to the transport unit, in particular the transport-away element. The transfer unit may be implemented at least partially or completely by physical elements, like for example by one or several product chutes, by one or several product ramp/s, by a product transport belt or several product transport belts, by one or several product transport chain/s, or the like. Alternatively or additionally, the transport unit may be implemented at least partially or completely by a software which is configured for a control or regulation of a movement of the mover, like for example for a control or regulation of a delay of the mover, in particular so as to enable an inertia-caused transfer of the product from the mover to the transport-away element.

The electrodynamic conveying unit preferably has an implementation already known to someone skilled in the art. The electrodynamic conveying unit preferentially comprises a plurality of—in particular horizontally aligned—movement area elements, which are equipped with electromagnetic drive elements and are connected to one another, in particular such that they form together a planar movement plane. The electrodynamic conveying unit preferably comprises a plurality of movers, which are—in particular due to an interaction of permanent magnets of the movers with the electromagnetic drive elements of the movement area elements-movable, in particular in a contact-free manner, relative to the movement area elements. In particular, the electrodynamic conveying unit is capable, in a manner already known to someone skilled in the art, of registering and evaluating a position of the respective movers with respect to the movement area elements in order to realize a control or regulation of a movement of the movers. With regard to a principal functionality and a principal implementation of the electrodynamic conveying unit of the handling device according to the invention, for example the product XPlanar of the company Beckhoff Automation GmbH & Co. KG or the product XBot® of the company Planar Motor Inc. may be referred to. The mover or the movers of the electrodynamic conveying unit allow/s especially flexible handling of products. For a handling of products, preferably at least one product receiving unit is arranged at each mover.

The product receiving unit is preferably realized as a kind of receiving shell in which products are arranged during a handling by the mover. The product receiving unit may be realized in a one-part implementation with the, in particular respective, mover or the product receiving unit may be fixed at the, in particular respective, mover by means of a form-fit and/or force-fit connection. A "one-part implementation" is in particular to mean connected at least by substance-to-substance bond, for example by a welding process, a gluing process, an injection-molding process and/or by a further process deemed expedient by someone skilled in the art, and/or advantageously formed in one piece, like for example by a production from a cast and/or by a production in a one-component or multi-component injection-molding procedure, and advantageously from a single blank. Preferably the product receiving unit comprises the at least one sidewall which extends transversally, in particular at least substantially perpendicularly, to the support surface of the product receiving unit and which delimits the product receiving space of the product receiving unit at least partially. The term "substantially perpendicularly" is in particular meant to define an orientation of a direction with respect to a reference direction, wherein the direction and the reference direction, in particular viewed in a projection plane, include an angle of 90°, the angle having a maximum deviation that is in particular smaller than 8°, advantageously smaller than 5° and especially advantageously smaller than 2°.

The front face of the product receiving unit, which is—in particular in at least one state—at least partially open, may preferably be formed by at least one opening of a sidewall arranged at the front face, which is delimited by at least two portions of the sidewall, by a nonexistence of a sidewall at the front face, by a sidewall that is supported movably at the sidewall or by other implementations of the product receiving unit which are deemed expedient by someone skilled in the art. Preferentially the product receiving unit comprises at least two sidewalls, which in particular extend at least substantially parallel to each other, which extend transversally to the support surface and at least partially delimit the product receiving space of the product receiving unit. In at least one exemplary embodiment of the handling device, the product receiving unit comprises at least three sidewalls which extend transversally, in particular at least substantially perpendicularly, to the support surface of the product receiving unit, wherein two of the three sidewalls are oriented at least substantially parallel to each other and one of the three sidewalls is oriented transversally, in particular at least substantially perpendicularly, to the two sidewalls of the three sidewalls. Viewed in a top view that extends at least substantially perpendicularly to the support surface and/or to the main extension plane, the three sidewalls preferably form a U-shaped edging of the product receiving space. It is also conceivable that the one of the three sidewalls which is oriented transversally, in particular at least substantially perpendicularly, to the two sidewalls of the three sidewalls, is divided into two subsections, such that viewed in a top view that extends at least substantially perpendicularly to the support surface and/or to the main extension plane, the sidewalls form two L-shaped edgings of the product receiving space. It is moreover conceivable that the product receiving unit comprises four sidewalls, which extend transversally to the support surface and delimit the product receiving space of the product receiving unit at least partially, wherein at least one for the four sidewalls is at least partially or fully movable, in order to at least partially open the front face in at least one state. It is conceivable that more than one of the sidewalls are movable so as to at least partially open more than one front face of the product receiving unit. The movable sidewall or the movable sidewalls may be supported at the mover pivotably or linearly movably. The movable sidewall/sidewalls may be movable actively or passively, like for example by means of an actuator that is arranged at the mover, by means of a slotted link along which the mover travels for moving the sidewall/s in order to open or close the sidewall/s, or may be movable actively or passively due to a different implementation that is deemed expedient by someone skilled in the art.

It is further proposed that the product receiving unit comprises at least one bottom, which has at least one slot-like or groove-like recess that is configured for an insertion of at least one transfer element of the transfer unit or for influencing a friction between a product arranged in the product receiving unit and the bottom, in particular the support surface, of the product receiving unit. Preferably the bottom is formed in a one-part implementation with the sidewall/s of the product receiving unit. However, it is also conceivable that the sidewall/s is/are fixed to the bottom by means of a form-fit and/or force-fit connection, like for example by a plugging connection, a latch connection, a tongue-and-groove connection, or the like. The bottom preferably extends transversally, in particular at least substantially perpendicularly, to the sidewall/s. Preferentially the bottom forms the support surface, in particular at least partially. In at least one exemplary embodiment of the handling device, the bottom has an, in particular single, slot-like or groove-like recess configured for an insertion of the at least one transfer element of the transfer unit, wherein a recess bottom surface of the recess, in particular a groove bottom of the recess, is arranged so as to be offset from the support surface in parallel, in particular along a direction that runs at least substantially perpendicularly to the support surface. Preferably, in particular in at least one exemplary embodiment of the handling device, the slot-like or groove-like recess is laterally delimited by at least one sub-surface of the support surface respectively. In particular in at least one exemplary embodiment of the handling device, the slot-like or groove-like recess is arranged along a central axis of the product receiving unit. In at least one exemplary embodiment of the handling device, the bottom comprises a plurality of slot-like or groove-like recesses, which are configured for influencing a friction between a product arranged in the product receiving unit and the bottom of the product receiving unit. Preferably all the slot-like or groove-like recesses run at least substantially parallel to one another, and in particular run at least substantially perpendicularly to the at least partially open front face. The slot-like or groove-like recesses preferably form longitudinal furrows in the bottom of the product receiving unit. Preferentially the slot-like or groove-like recesses are separated from each other by webs, upper sides of the webs forming the support surface of the product receiving unit. It is moreover conceivable that for the purpose of influencing a friction between a product arranged in the product receiving unit and the bottom, the support surface of the product receiving unit is provided with a non-stick coating, like for example a coating of polytetrafluoroethylene (PTFE), of ceramic, of a diamond-like carbon layer (DLC layer), or the like, or that the bottom, in particular the support surface, is made of a non-stick material, like for example of polytetrafluoroethylene (PTFE), of ceramic, or the like. Implementation according to the invention enables removal of products from the product receiving space in a constructionally simple manner. It is advantageously possible to realize removal of a product from the product receiving unit by a movement of the mover alone, in particular by the mover passing at least partially under a ramp-shaped transfer element, or due to a braking process of the mover.

It is also proposed that the product receiving unit comprises at least one, in particular the aforementioned, bottom, which has at least one, in particular the aforementioned, slot-like or groove-like recess that extends, starting from the at least partially open front face, at least largely over the entire longitudinal extent of the product receiving unit. "At least largely" is in particular to mean by more than 50%, preferably by more than 70% and particularly preferably by more than 90% of a maximum total extent along a direction, of a maximum total mass or of another measurable maximum property of a reference element or of a reference unit. Preferentially the slot-like or groove-like recess for an insertion of at least one transfer element of the transfer unit extends completely over the entire longitudinal extension of the product receiving unit. Preferably the slot-like or groove-like recesses for influencing a friction between a product arranged in the product receiving unit and the bottom of the product receiving unit extend from the at least partially open front face, in particular in a straight fashion, as far as the one sidewall of the three sidewalls that delimits the product receiving space on a side of the product receiving unit facing away from the at least partially open front face. Implementation according to the invention enables removal of products from the product receiving space in a manner that is particularly simple in terms of construction. It is especially advantageously possible to realize complete guiding through of a transfer element by a movement of the mover alone, in particular by the mover passing at least partially under the ramp-shaped transfer element. It is especially advantageously possible to realize removal of a product from the product receiving unit by a braking process of the mover, in particular by an inertia-caused sliding of the product out of the product receiving space as a consequence of the braking process and of a friction area between the product and the bottom being small.

Beyond this it is proposed, in particular in at least one exemplary embodiment of the handling device, that the product receiving unit comprises at least one ramp element, which is configured to arrange products in the product receiving space in an inclined fashion. The ramp element preferably forms at least a portion of the support surface of the product receiving unit. Preferably the ramp element forms an inclined plane with respect to the bottom. Preferentially the ramp element is oriented at an inclination relative to the bottom. Preferentially the ramp element is arranged only in a subregion of the product receiving space. The ramp element is in particular arranged directly adjacent to at least one of the sidewalls. It is conceivable that the ramp element at least partially forms one of the sidewalls, is realized in a one-part implementation with one of the sidewalls or is fixed to the bottom by a form-fit and/or force-fit connection. Further implementations or arrangements of the ramp element, deemed expedient by someone skilled in the art, are also conceivable. The product receiving unit preferably comprises at least two ramp elements. The at least two ramp elements are preferably arranged in the product receiving space mirror-symmetrically with respect to a longitudinal axis of the product receiving unit. It is moreover also conceivable that the at least two ramp elements have a different arrangement in the product receiving space that is deemed expedient by someone skilled in the art. Preferably the at least two ramp elements have at least substantially analogous design. The ramp elements may be provided with a non-stick coating or may have further surface designs which are deemed expedient by someone skilled in the art and are configured for influencing a friction between a product adjoining the ramp elements and the surface of the ramp elements. Implementation according to the invention enables an inclination of products in the product receiving space in a constructionally simple manner, in particular in order to enable removal due to an interaction of the products with a transfer element that can be moved underneath the product arranged in the product receiving space. It is possible to realize removal of products out of the product receiving space in a manner that is particularly simple in terms of construction. It is especially advantageously possible to realize complete guiding-through of a transfer element by a movement of the mover alone, in particular by the mover passing at least partially underneath the ramp-shaped transfer element.

Furthermore, it is proposed, in particular in at least one exemplary embodiment of the handling device, that the product receiving unit comprises at least one, in particular the aforementioned, bottom having at least one, in particular the aforementioned, slot-like or groove-like recess, and comprises at least one, in particular the aforementioned, ramp element, which is arranged laterally offset from the recess. Preferably the two ramp elements are arranged laterally offset from the recess. In particular, respectively one of the ramp elements is arranged on a side of the recess. Preferably, one of the ramp elements is arranged offset from the recess on a lefthand side, and the other one of the ramp elements is arranged offset from the recess on a righthand side. The recess is preferably arranged between the two ramp elements, in particular when viewed along a direction that runs at least substantially perpendicularly to the longitudinal axis of the product receiving unit. Implementation according to the invention allows realizing, in a constructionally simple manner, an inclination of products in the product receiving space and at the same time a possibility of inserting a transfer element which can be moved underneath the product situated in the product receiving space. It is possible to realize removal of products from the product receiving space in a manner that is particularly simple in terms of construction. Especially advantageously, it is possible to realize complete guiding-through of a transfer element by a movement of the mover alone, in particular by the mover at least partially passing underneath the ramp-shaped transfer element.

It is also proposed, in particular in at least one exemplary embodiment of the handling device, that the handling device comprises at least one control or regulation unit, which is formed at least partially integrally with the transfer unit and is configured to control or regulate an acceleration characteristic of the mover in such a way that a product transfer of products between the transport unit and the mover can be carried out depending on a change in the acceleration characteristic. By "units being formed at least partially integrally" is in particular to be understood that the units have at least one shared element, in particular a shared computing element or a shared memory element. Preferably, in an exemplary embodiment of the handling device in which the transfer unit is implemented at least partially or completely by a software, the control or regulation unit is formed at least partially integrally with the transfer unit. Preferentially the control or regulation unit is configured to control or regulate a delay of the mover in such a way that a product transfer from the mover to the transport unit, in particular to the transport-away element, can be carried out depending on the delay of the mover. In particular, the product is transferable to the transport unit, in particular to the transport-away element, as a result of a braking process of the mover that is inducible by the control or regulation unit and of an inertia-caused continued movement of the product relative to the mover through the at least partially open front face. It is also conceivable that the control or regulation unit is configured to control or regulate an acceleration of the mover in such a way that a product transfer from the mover to the transport unit, in particular to the transport-away element, can be carried out depending on the acceleration of the mover, in particular if a ramp-like transfer element of the transfer unit is arranged upstream of the transport unit, in particular of the transport-away element. In particular, as a result of an acceleration of the mover inducible by the control or regulation unit, when an, in particular self-driveless, inclined transport element is guided through, the product can be moved on through the recess of the product receiving unit, on the inclined transfer element, until transferred to the transport-away element. Further implementations or functionalities, deemed expedient by someone skilled in the art, of the control or regulation of an acceleration characteristic of the mover for the purpose of influencing the product transfer are also conceivable. Implementation according to the invention advantageously enables removal of a product from the product receiving unit by a movement of the mover alone, in particular by the mover passing at least partially under a ramp-shaped transfer element or due to a braking process of the mover.

Furthermore, a production machine with at least one handling device according to the invention is proposed. The production machine may comprise further devices and/or units which are deemed expedient by someone skilled in the art and can be used for a handling of products, in particular food products. The production machine is preferably configured for production, filling, packaging and/or secondary packaging of food products. The production machine may thus comprise, in addition to the handling device, a plurality of further devices and/or units deemed expedient by someone skilled in the art, like for example a forming device for packagings, a cutting apparatus, a filling device, a sterilization device, a closing device, a secondary-packaging apparatus, or the like. Implementation according to the invention advantageously allows secure arrangement of a product in the product receiving unit, realizing at the same time easy removability of the product from the product receiving unit. Advantageously a high degree of flexibility is attainable within a transport process of the production machine.

Beyond this, a mover is proposed, with a product receiving unit for a handling device according to the invention arranged on the mover. Implementation according to the invention advantageously allows secure arrangement of a product in the product receiving unit, realizing at the same time easy removability of the product from the product receiving unit. It is advantageously possible to realize cost-efficient retrofitting of already existing handling devices with a mover of the handling device according to the invention, wherein a product receiving unit of the handling device according to the invention is arranged at the mover.

The invention is further based on a method for a transfer of products, in particular food products, by means of a handling device according to the invention. It is proposed that for a product transfer of at least one product between the transport unit and the mover, the product is conveyed out of the product receiving space via the open front face. Implementation according to the invention advantageously allows realizing a high level of flexibility in a transport process.

It is proposed that a product transfer of at least one product between the transport unit and the mover is carried out depending on a change in an acceleration characteristic of the mover, in particular depending on a delay of the mover. It is preferentially possible to realize a product transfer of at least one product between the transport unit and the mover by abrupt braking or abrupt increasing of the speed of the mover. Implementation according to the invention advantageously allows realizing a simple transfer by means of a cost-efficient software solution, in particular also for an advantageous implementation of a cost-efficient retrofitting solution.

It is moreover proposed that for a product transfer of at least one product between the transport unit and the mover, at least one, in particular the aforementioned, transfer element of the transfer unit is inserted into an, in particular the aforementioned, slot-like or groove-like recess of an, in particular the aforementioned, bottom of the product receiving unit. Advantageously, additional guiding of the mover during a product transfer is realizable by means of the implementation according to the invention.

Beyond this it is proposed that for a product transfer of at least one product between the transport unit and the mover, the mover passes under at least one, in particular the aforementioned, transfer element of the transfer unit. Implementation according to the invention advantageously allows realizing a simple transfer of products, in particular with additional inclination of products in the product receiving space.

The handling device according to the invention, the production machine according to the invention, the mover according to the invention and/or the method according to the invention shall here not be limited to the application and implementation described above. In particular, in order to fulfill a functionality that is described here, the handling device according to the invention, the production machine according to the invention, the mover according to the invention and/or the method according to the invention may comprise a number of individual elements, components and units as well as method steps that differs from a number given here. Moreover, with regard to the value ranges given in this disclosure, values situated within the limits mentioned shall also be considered as disclosed and as applicable according to requirements.

BRIEF DESCRIPTION OF THE DRAWINGS

Further advantages will become apparent from the following description of the drawings. In the drawings exemplary embodiments of the invention are illustrated. The drawings, the description and the claims contain a plurality of features in combination. Someone skilled in the art will purposefully also consider the features individually and will find further expedient combinations.

It is shown in.

DETAILED DESCRIPTION

Figure 1:
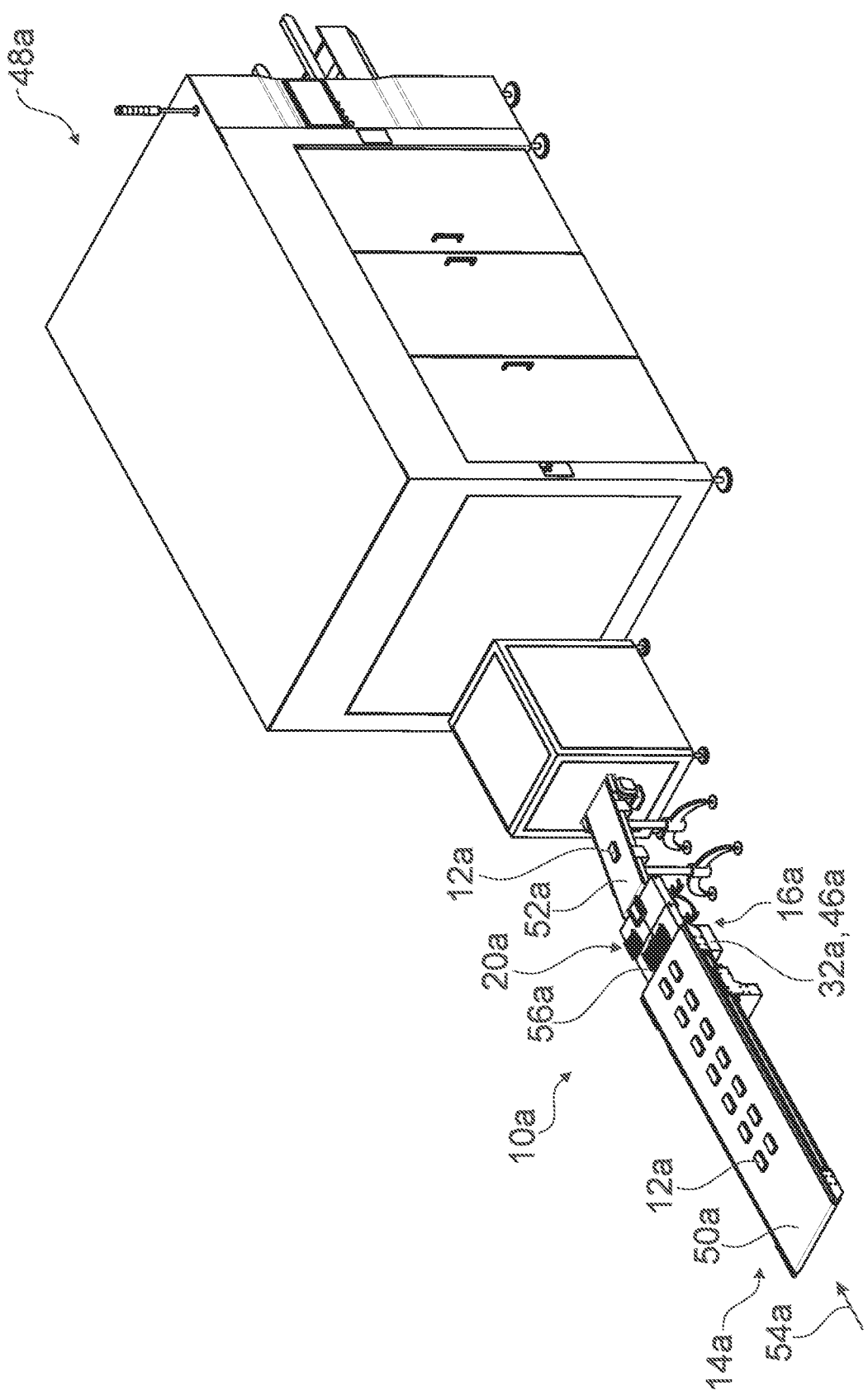
FIG. 1 a production machine according to the invention with at least one handling device according to the invention, in a schematic illustration, FIG. 2 a detailed view of a mover according to the invention, with a product receiving unit of the handling device according to the invention arranged thereon, in a schematic illustration, FIG. 3 a first alternative implementation of a handling device according to the invention, in a schematic illustration, FIG. 4 a second alternative implementation of a handling device according to the invention, in a schematic illustration, FIG. 5 a third alternative implementation of a handling device according to the invention, in a schematic implementation, FIG. 6 a detailed view of an alternative mover according to the invention, with a product receiving unit of the third alternative implementation of the handling device according to the invention, in a schematic illustration, FIG. 7 a fourth alternative implementation of a handling device according to the invention, in a schematic illustration, FIG. 8 a fifth alternative implementation of a handling device according to the invention, in a schematic illustration, and FIG. 9 a schematic process flow of a method for a transfer of products according to the invention.

FIG. 1 shows a production machine 48a with at least one handling device 10a. The production machine 48a is preferentially configured for a production and/or for a processing of products 12a, in particular food products. The production machine 48a may be embodied, for example, as a food-product packaging machine, as a food-product filling machine, as a food-product production machine, as a combination of the above-mentioned machines, or something like that. The production machine 48a may comprise further devices and/or units which are deemed expedient by someone skilled in the art and which may be used for a production and/or processing of products 12a, in particular food products, like for example a sterilization device, a filling device, a closure device, a secondary packaging device, or the like.

The handling device 10a is configured at least for a transfer of products 12a, in particular food products. The handling device 10a comprises at least one transport unit 14a, in particular a conveyor belt unit, at least one electrodynamic conveying unit 16a comprising at least one electrodynamically movable mover 18a (see FIG. 2) and at least one product receiving unit 20a which is arranged at the mover 18a, and comprises at least one transfer unit 32a for a product transfer of products 12a between the transport unit 14a and the mover 18a. Preferably the electrodynamic conveying unit 16a comprises a plurality of movers 18a, which are movable in a manner already known to someone skilled in the art, in particular with six degrees of freedom, on movement area elements 56a of the electrodynamic conveying unit 16a.

Preferentially the transport unit 14a is configured for a transport of products 12a, in particular of already packaged food products. Preferably the transport unit 14a is configured for a feeding of products 12a to the transfer unit 32a and/or for a transport of products 12a away from the transfer unit 32a. Preferably the transport unit 14a comprises at least one feed transport element 50a, in particular a feed transport belt, for a feeding of products 12a to the transfer unit 32a and at least one transport-away element 52a, in particular a transport-away belt. Preferably the feed transport element 50a forms a transport section of the transport unit 14a. Preferentially the transport-away element 52a forms a further transport section of the transport unit 14a. Preferentially, viewed along a main transport direction 54a of the transport unit 14a, the electrodynamic conveying unit 16a and the transfer unit 32a are arranged between the transport section and the further transport section of the transport unit 14a. In particular, viewed along the main transport direction 54a of the transport unit 14a, the electrodynamic conveying unit 16a and the transfer unit 32a are arranged between the feed transport element 59a and the transport-away element 52a. However, it is also conceivable that the electrodynamic conveying unit 16a and the transfer unit 32a are arranged in a different position, deemed expedient by someone skilled in the art, relative to the transport sections of the transfer unit 14a.

The transfer unit 32a is preferably configured for a transfer of products 12a from the transport unit 14a, in particular the feed transport element 50a, to the mover 18a and/or for a transfer of products 12a from the mover 18a to the transport unit 14a, in particular to the transport-away element 52a. The transfer unit 32a may be implemented at least partially or completely by physical elements, like for example one or several product chute/s, one or several product ramp/s, a product transport belt or several product transport belts, one or several product transport chain/s, or the like. Alternatively or additionally, the transfer unit 32a may be implemented at least partially or completely by a software that is configured for a control or regulation of a movement of the mover 18a and/or for a control or regulation of a movement of the feed transport element 50a, like for example for a control or regulation of a delay of the mover 18a, in particular in order to realize an inertia-caused transfer of products 12a from the mover 18a to the transport-away element 52a, and/or for a control or regulation of an acceleration of the feed transport element 50a and of a movement of the mover 18a for a selective transfer, in particular "shooting-in", of products 12a arranged on the feed transport element 50a, to, in particular into the mover 18a, or the like.

The handling device 10a preferentially comprises at least one control or regulation unit 46a which, in particular at least in the exemplary embodiment of the handling device 10a illustrated in FIG. 1, is embodied at least partially integrally with the transfer unit 32a and is configured to control or regulate an acceleration characteristic of the mover 18a in such a way that a product transfer of products 12a between the transport unit 14a, in particular, the transport-away element 52a, and the mover 18a can be realized depending on a change in the acceleration characteristic. Preferentially the control or regulation unit 46a is configured to control or regulate a delay of the mover 18a in such a way that a product transfer from the mover 18a to the transport unit 14a, in particular to the transport-away element 52a, can be realized depending on the delay of the mover 18a. In particular, as a result of a braking process of the mover 18a induced by the control or regulation unit 46a and due to an inertia-caused continued movement of a product 12a relative to the mover 18a, the product 12a arranged in the product receiving unit 20a is transferable to the transport unit 14a, in particular to the transport-away element 52a, through an at least partially open front face 34a of the product receiving unit 20a. In the exemplary embodiment of the handling device 10a illustrated in FIG. 1, the control or regulation unit 46a is preferably configured to control or regulate a movement and/or an acceleration of the transport unit 14a, in particular of the feed transport element 50a, and a movement of the mover 18a in such a way that a product transfer from the transport unit 14a to the mover 18a, in particular from the feed transport element 50a to the mover 18a, is realized in such a way that the mover 18a, in particular the product receiving unit 20a, faces toward the transport unit 14a, in particular the feed transport element 50a, with the open front face 34a, and the transport unit 14a, in particular the feed transport element 50a, is moved and/or accelerated in such a way that a product 12a is moved, in particular "shot", into the product receiving unit 20a. However, alternatively or additionally it is conceivable that in the exemplary embodiment of the handling device 10a illustrated in FIG. 1, the transfer unit 32a comprises a transfer element (not shown in FIG. 1) at the end of the feed transport element 50a, which is embodied as a ramp by means of which a product 12a can glide into the product receiving unit 20a. For a product transfer, further implementations and/or functionalities of the transfer unit 32a and/or of the control or regulation unit 46a, deemed expedient by someone skilled in the art, are also conceivable.

Figure 2:
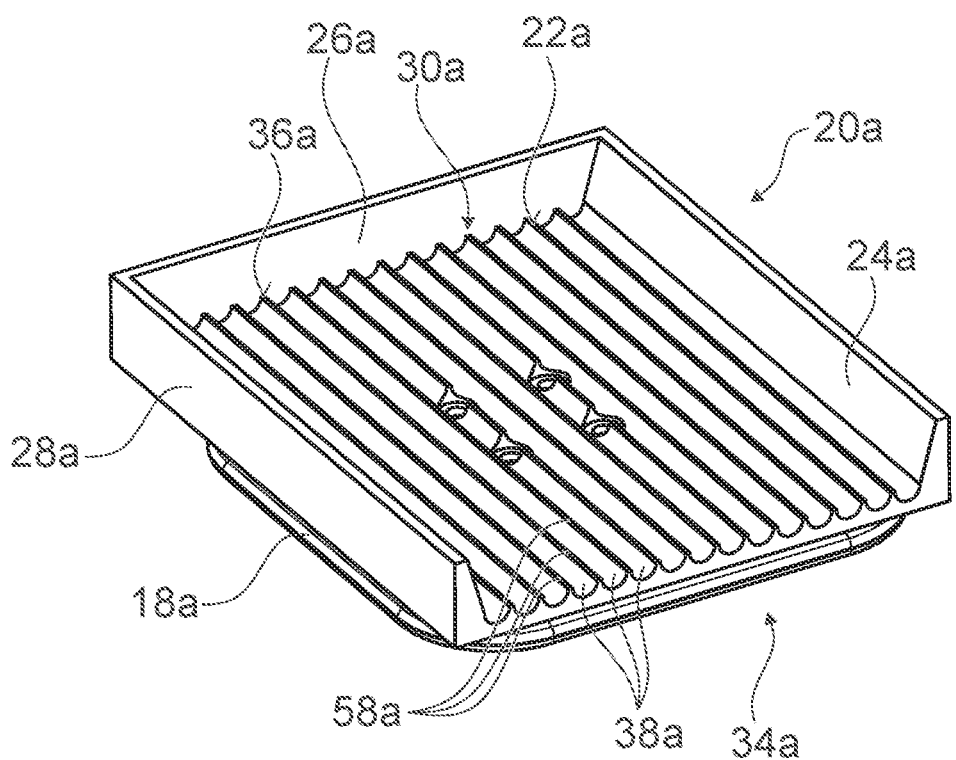

FIG. 2 shows a detailed view of the mover 18a, which is preferably to be regarded as representative for all movers 18a of the electrodynamic conveying unit 16a. The product receiving unit 20a is arranged on the mover 18a. The product receiving unit 20a may be realized in a one-part implementation with the mover 18a or the product receiving unit 20a may be fixed at the mover 18a by means of a form-fit and/or force-fit connection. The product receiving unit 20a comprises at least one sidewall 24a, 26a, 28a, which extends transversally to a support surface 22a of the product receiving unit 20a and delimits a product receiving space 30a of the product receiving unit 20a at least partially. Viewed in a plane extending at least substantially perpendicularly to a main extension plane of the product receiving unit 20a, the product receiving unit 20a has at least the at least partially open front face 34a. The at least partially open front face 34a of the product receiving unit 20a is preferably realized by a nonexistence of a sidewall at the front face 34a. However, it is also conceivable that the front face 34a of the product receiving unit 20a, which is—in particular in at least one state—at least partially open, is realized by an opening of a sidewall arranged at the front face 34a, which is delimited by at least subsections of the sidewall, by a sidewall that is supported movably at the front face 34a, or by other implementations of the product receiving unit 20a deemed expedient by someone skilled in the art.

Preferentially the product receiving unit 20a comprises at least two sidewalls 24a, 28a, which in particular extend at least substantially parallel to each other, which extend transversally to the support surface 22a and which delimit the product receiving space 30a of the product receiving unit 20a at least partially. In the exemplary embodiment of the handling device 10a illustrated in FIGS. 1 and 2, the product receiving unit 20a comprises at least three sidewalls 24a, 26a, 28a in total, which extend transversally, in particular at least substantially perpendicularly, to the support surface 22a of the product receiving unit 20a, wherein two sidewalls 24a, 28a of the three sidewalls 24a, 26a, 28a are oriented at least substantially parallel to each other and one sidewall 26a of the three sidewalls 24a, 26a, 28a is oriented transversally, in particular at least substantially perpendicularly, to the two sidewalls 24a, 28a of the three sidewalls 24a, 26a, 28a. Viewed in a top view at least substantially perpendicularly to the support surface 22a and/or to the main extension plane, the three sidewalls 24a, 26a, 28a preferably form a U-shaped edging of the product receiving space 30a.

The product receiving unit 20a comprises at least one bottom 36a having at least one slot-like or groove-like recess 38a which is configured for influencing a friction between a product 12a arranged in the product receiving unit 20a and the bottom 36a of the product receiving unit 20a. The slot-like or groove-like recess 38a preferentially extends, starting from the at least partially open front face 34a, at least largely over the entire longitudinal extension of the product receiving unit 20a. Preferably the bottom 36a is realized in a one-part implementation with the sidewalls 24a, 26a, 28a of the product receiving unit 20a. However, it is also conceivable that the sidewalls 24a, 26a, 28a are fixed at the bottom 36a by a form-fit and/or force-fit connection, like for example by a plugging connection, a latch connection, a tongue-and-groove connection, or the like. The bottom 36a preferably extends transversally, in particular at least substantially perpendicularly, to the sidewalls 24a, 26a, 28a. Preferentially the bottom 36a forms the support surface 22a, in particular at least partially. In the exemplary embodiment of the handling device 10a illustrated in FIGS. 1 and 2, the bottom 36a comprises a plurality of slot-like or groove-like recesses 38a, which are configured for influencing a friction between a product 12a arranged in the product receiving unit 20a and the bottom 36a of the product receiving unit 20a. Preferably, all the slot-like or groove-like recesses 38a extend at least substantially parallel to one another, and in particular extend at least substantially perpendicularly to the at least partially open front face 34a. The slot-like or groove-like recesses 38a preferably form longitudinal furrows in the bottom 36a of the product receiving unit 20a. Preferentially the slot-like or groove-like recesses 38a are separated from one another by webs 58a of the product receiving unit 20a, the upper sides of the webs 58a forming the support surface 22a of the product receiving unit 20a. It is moreover conceivable that for the purpose of influencing a friction between a product 12a arranged in the product receiving unit 20a and the bottom 36a, the support surface 22a of the product receiving unit 20a is provided with a non-stick coating, like for example a coating of polytetrafluoroethylene (PTFE), of ceramic, of a diamond-like carbon layer (DLC layer), or the like, or that the bottom 36a, in particular the support surface 22a, is made of a non-stick material, like for example of polytetrafluoroethylene (PTFE), of ceramic, or the like.

Figure 9:
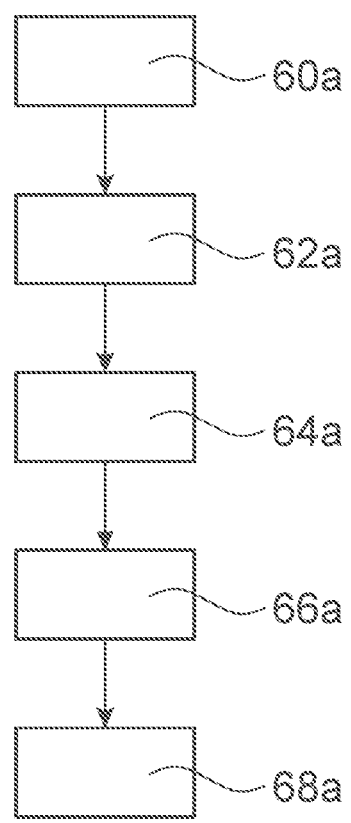

In FIG. 9 a schematic process flow of a method for a transfer of products 12a by means of the handling device 10a is illustrated, wherein the process flow at least substantially concerns all exemplary embodiments of the handling devices 10a; 10b; 10c; 10d; 10e; 10f described here. Differences in the process flow will be explained in detail for the respective exemplary embodiments.

The method for a transfer of products 12a, in particular food products, by means of the handling device 10a comprises in at least one method step a feeding of products 12a by means of the transport unit 14a, in particular by means of the feed transport element 50a. In at least one method step 62a of the method, a product transfer of at least one product 12a from the transport unit 14a, in particular the feed transport element 50a, to one of the movers 18a is realized by means of the transfer unit 32a.

In at least one method step 64a of the method, a transport of at least one product 12a to the transport-away element 52a is realized by means of the at least one mover 18a via the movement area elements 56a. In at least one method step 66a, a product transfer from the mover 18a to the transport-away element 52a is realized. For a product transfer of the at least one product 12a between the transport unit 14a and the mover 18a, in particular from the mover 18a to the transport-away element 52a, the product 12a is conveyed out of the product receiving space 30a via the open front face 34a. In the exemplary embodiment of the handling device 10a illustrated in FIGS. 1 and 2, a product transfer of at least one product 12a between the transport unit 14a and the mover 18a, in particular from the mover 18a to the transport-away element 52a, is carried out depending on a change in an acceleration characteristic, in particular depending on a delay of the mover 18a. In at least one method step 68a, a transporting away of products 12a is realized by means of the transport-away element 52a, in particular a transport of products 12a to further devices and/or units of the production machine 48a. Further additional or alternative method steps, deemed expedient by someone skilled in the art, are also conceivable.

In FIGS. 3 to 8 further exemplary embodiments of the invention are shown. The following descriptions and the drawings are essentially limited to the differences between the exemplary embodiments, wherein regarding components having the same denomination, in particular components having the same reference numerals, principally the drawings and/or the description of the other exemplary embodiments, in particular of FIGS. 1, 2 and 9, may be referred to. In order to distinguish between the exemplary embodiments, the letter a has been added to the reference numerals of the exemplary embodiment of FIGS. 1, 2 and 9. In the exemplary embodiment of FIGS. 3 to 8 the letter a has been substituted by the letters b to f.

Figure 3:
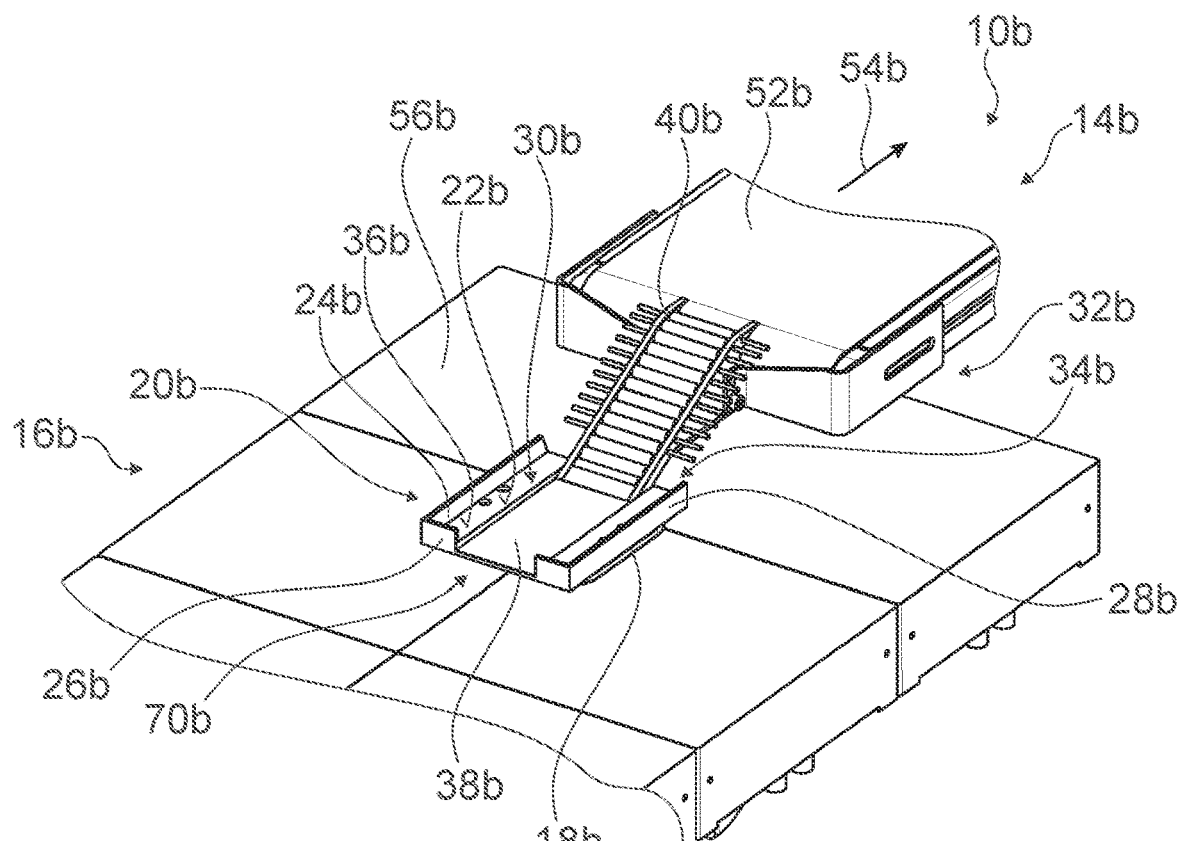

FIG. 3 shows a handling device 10b for a transfer of products (not shown here in detail), in particular food products, with at least one transport unit 14b, in particular a conveyor belt unit, with at least one electrodynamic conveying unit 16b comprising at least one electrodynamically movable mover 18b and at least one product receiving unit 20b which is arranged at the mover 18b and has at least one sidewall 24b, 26b, 28b extending transversally to a support surface 22b of the product receiving unit 20b and at least partially delimiting a product receiving space 30b of the product receiving unit 20b, and with at least one transfer unit 32b for a product transfer of products between the transport unit 14b and the mover 18b. Viewed in a plane extending at least substantially perpendicularly to a main extension plane of the product receiving unit 20b, the product receiving unit 20b has an at least partially open front face 34b. The product receiving unit 20b illustrated in FIG. 3 preferentially comprises at least two at least partially open front faces 34b, 70b. One front face 34b of the at least partially open front faces 34b, 70b of the product receiving unit 20b is preferably realized by a non-existence of a sidewall at the front face 34b. The other front face 70b of the at least partially open front faces 34b, 70b is preferably realized by at least one opening of a sidewall 26b that is arranged at the other front face 70b, said opening being delimited by at least two subsections of the sidewall 26b of the product receiving unit 20b. Preferentially the product receiving unit 20b comprises at least three sidewalls 24b, 26b, 28b extending transversally, in particular at least substantially perpendicularly, to the support surface 22b of the product receiving unit 20b, wherein two sidewalls 24b, 28b of the three sidewalls 24b, 26b, 28b are oriented parallel to each other and one sidewall 26b of the three sidewalls 24b, 26b, 28b is divided into two subsections and is oriented transversally, in particular at least substantially perpendicularly, to the two sidewalls 24b, 28b of the three sidewalls 24b, 26b, 28b. Viewed in a top view that is at least substantially perpendicular to the support surface 22b and/or to the main extension plane, the three sidewalls 24b, 26b, 28b form two L-shaped edgings of the product receiving space 30b.

The product receiving unit 20b comprises at least one bottom 36b having at least one slot-like or groove-like recess 38b, which is configured for an insertion of at least one transfer element 40b of the transfer unit 32b. The slot-like or groove-like recess 38b extends, starting from the at least partially open front face 34b, at least largely over the entire longitudinal extension of the product receiving unit 20b, in particular as far as the other at least partially open front face 70b.

The transfer element 40b is preferably arranged at a transition between the electrodynamic conveying unit 16b and the transport unit 14b, in particular at a transport-away element 52b of the transport unit 14b. The transfer element 40b is preferentially oriented in an inclined fashion relative to a transport surface of the transport unit 14b, in particular of the transport-away element 52b. Preferentially the transfer element 40b comprises a plurality of rollers, which are arranged behind one another along a gradient of the transfer element 40b. The rollers of the transfer element 40b may be implemented so as to be drivable individually or together, or may be implemented so as to be driveless. Preferably, for a product transfer of at least one product between the transport unit 14b and the mover 18b, in particular from the mover 18b to the transport-away element 52b, the transfer element 40b of the transfer unit 32b is inserted into the slot-like or groove-like recess 38b of the bottom 36b of the product receiving unit 20b. The mover 18b is passed underneath the transfer element 40b in order to transfer the product to the transfer element 40b or to provide the product with an impulse, such that the product is moved upwards along the gradient of the transfer element 40b up to the transport-away element 52b. For a product transfer of at least one product between the transport unit 14b and the mover 18b, in particular from the mover 18b to the transport-away element 52b, the mover 18b passes underneath the transfer element 40b of the transfer unit 32b. Further features of the handling device 10b and/or of a method for a transfer of products may preferably be taken from the description of FIGS. 1, 2 and 9.

Figure 4:
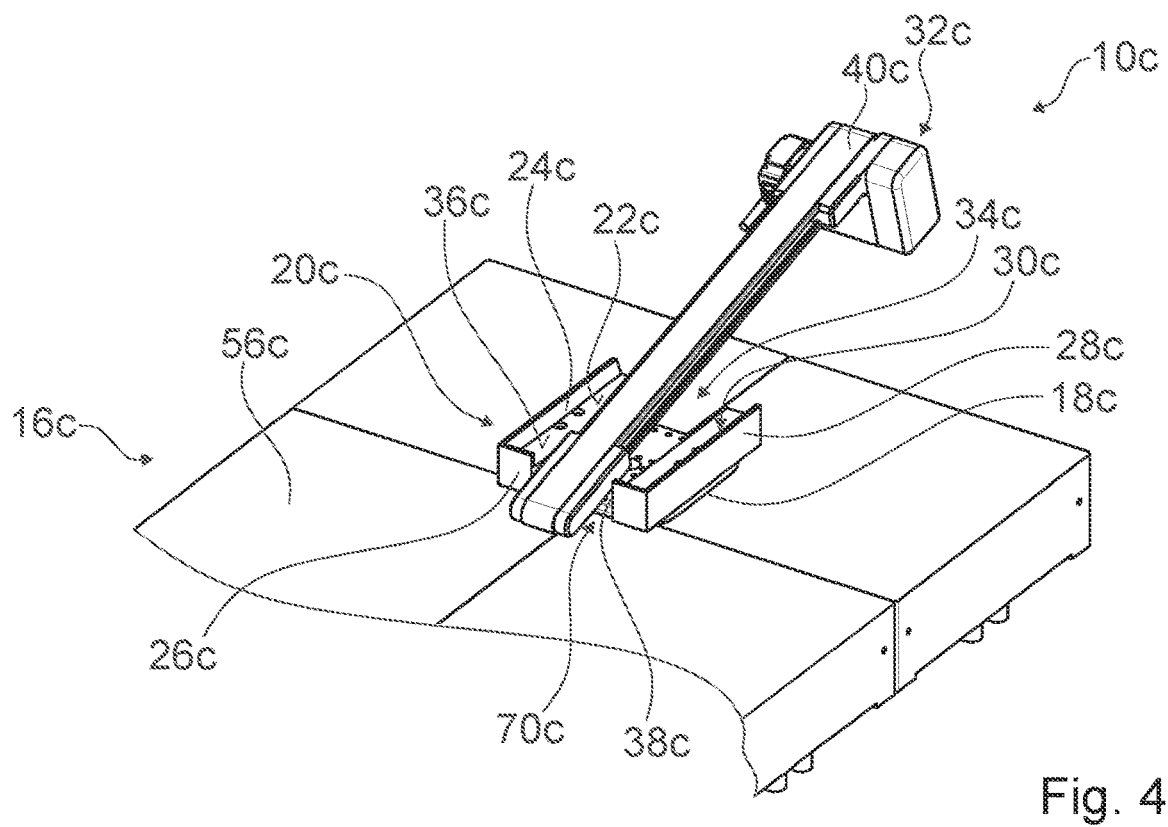

FIG. 4 shows a handling device 10c for a transfer of products (not shown here in detail), in particular food products, with at least one transport unit (not shown here in detail), in particular a conveyor belt unit, with at least one electrodynamic conveying unit 16c comprising at least one electrodynamically movable mover 18c and at least one product receiving unit 20c which is arranged at the mover 18c and comprises at least one sidewall 24c, 26c, 28c extending transversally to a support surface 22c of the product receiving unit 20c and at least partially delimiting a product receiving space 30c of the product receiving unit 20c, and with at least one transfer unit 32c for a product transfer of products between the transport unit and the mover 18c. Viewed in a plane extending at least substantially perpendicularly to a main extension plane of the product receiving unit 20c, the product receiving unit 20c has at least one at least partially open front face 34c. The product receiving unit 20c illustrated in FIG. 4 preferably has at least two at least partially open front faces 34c, 70c. One front face 34c of the at least partially open front faces 34c, 70c of the product receiving unit 20c is preferably realized by a non-existence of a sidewall at the front face 34c. The other front face 70c of the at least partially open front faces 34c, 70c is preferably realized by at least one opening of a sidewall 26c that is arranged at the other front face 70c, said opening being delimited by at least two subsections of the sidewall 26c of the product receiving unit 20c. Preferentially the product receiving unit 20c comprises at least three sidewalls 24c, 26c, 28c which extend transversally, in particular at least substantially perpendicularly, to the support surface 22c of the product receiving unit 20c, wherein two sidewalls 24c, 28c of the three sidewalls 24c, 26c, 28c are oriented at least substantially parallel to each other and one sidewall 26c of the three sidewalls 24c, 26c, 28c is divided into two subsections and is oriented transversally, in particular at least substantially perpendicularly, to the two sidewalls 24c, 28c of the three sidewalls 24c, 26c, 28c. Viewed in a top view that is at least substantially perpendicular to the support surface 22c and/or to the main extension plane, the three sidewalls 24c, 26c, 28c form two L-shaped edgings of the product receiving space 30c.

The product receiving unit 20c comprises at least one bottom 36c having at least one slot-like or groove-like recess 38c, which is configured for an insertion of at least one transfer element 40c of the transfer unit 32c. The slot-like or groove-like recess 38c extends, starting from the at least partially open front face 34c, at least largely over the entire longitudinal extension of the product receiving unit 20c, in particular as far as the other at least partially open front face 70c.

The transfer element 40c is preferably arranged at a transition between the electrodynamic conveying unit 16c and the transport unit, in particular at a transport-away element (not shown here) of the transport unit. The transfer element 40c is preferentially oriented so as to be inclined relative to a transport surface of the transport unit, in particular of the transport-away element. Preferentially the transfer element 40c is realized as an endless conveyor belt which is drivable in a circulating fashion. Preferably, for a product transfer of at least one product between the transport unit and the mover 18c, in particular from the mover 18c to the transport-away element, the transfer element 40c is inserted into the slot-like or groove-like recess 38c of the bottom 36c of the product receiving unit 20c. The mover 18c is passed underneath the transfer element 40c in order to transfer the product to the transfer element 40c. As soon as the product is in contact with the transfer element 40c, the product is preferably taken from the mover 18c due to the driven transfer element 40c, is further transported by means of the transfer element 40c and is transferred to the transport-away element. For a product transfer of at least one product between the transport unit and the mover 18c, in particular from the mover 18c to the transport-away element, the mover 18c passes underneath the transfer element 40c of the transfer unit 32c. Preferably, further features of the handling device 10c and/or of a method for a transfer of products may be taken from the description of FIGS. 1, 2 and 9.

Figure 5:
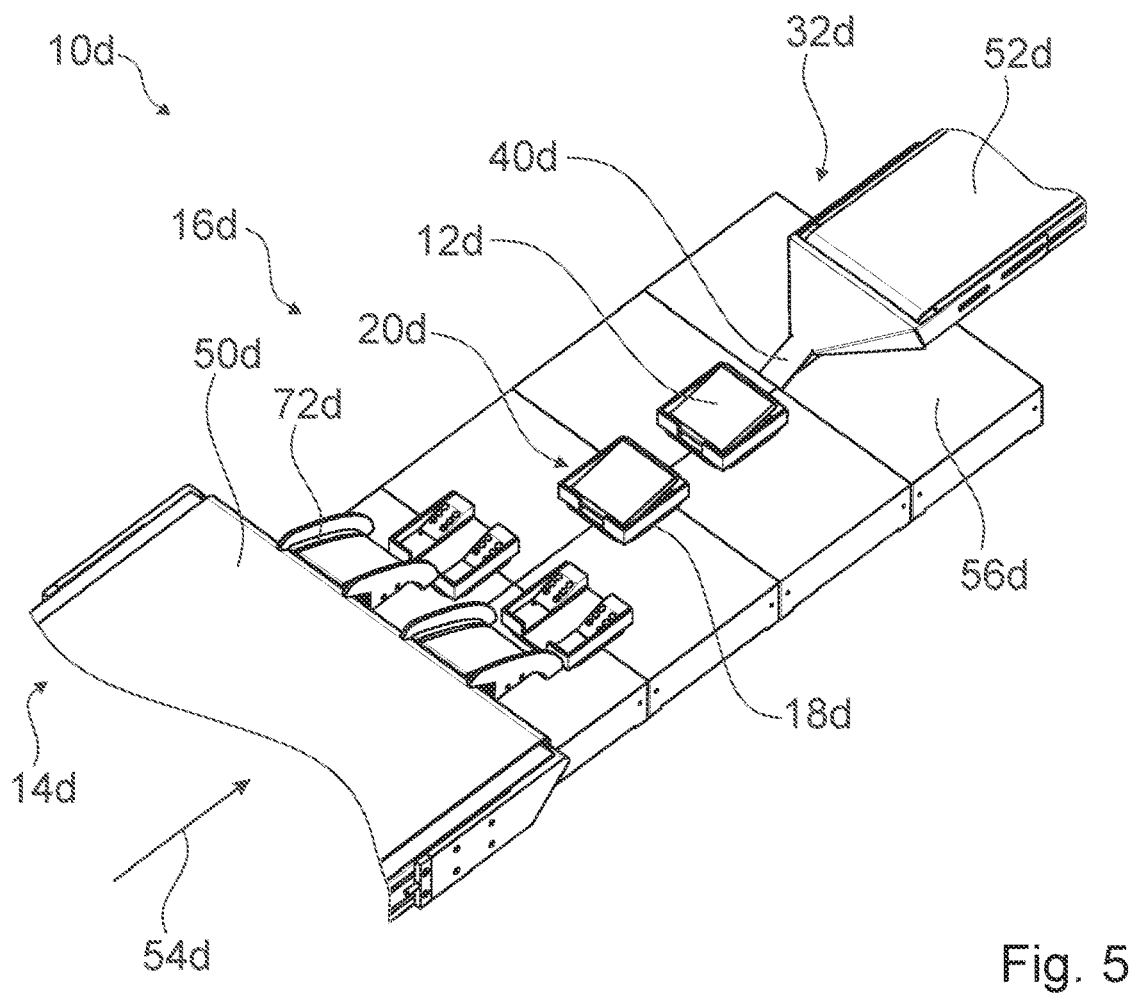
Figure 6:
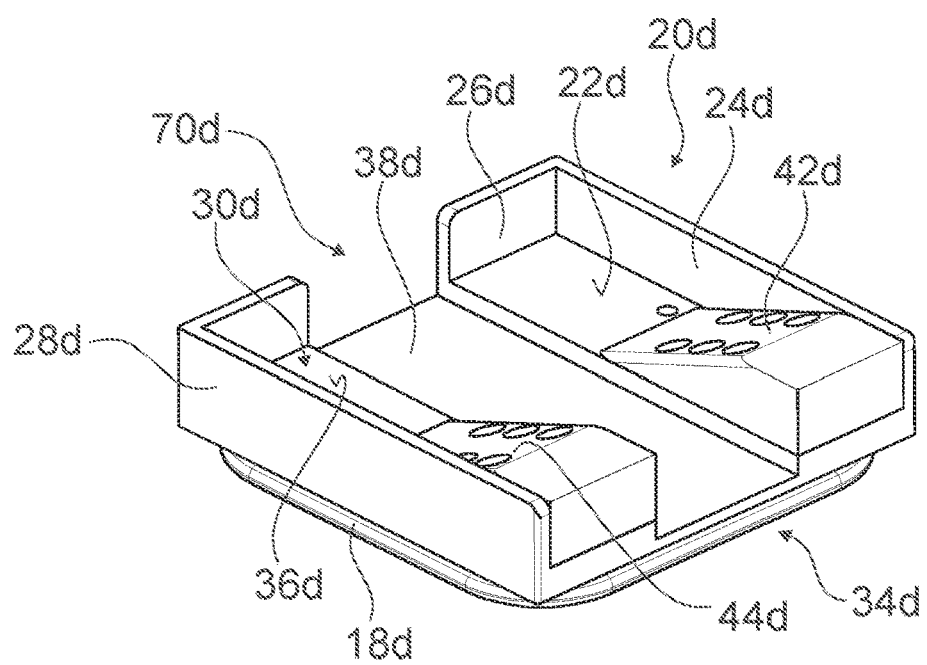

FIG. 5 shows a handling device 10d for a transfer of products 12d, in particular food products, with at least one transport unit 14d, in particular a conveyor belt unit, with at least one electrodynamic conveying unit 16d comprising at least one electrodynamically movable mover 18d and at least one product receiving unit 20d which is arranged at the mover 18d and has at least one sidewall 24d, 26d, 28d extending transversally to a support surface 22d of the product receiving unit 20d and at least partially delimiting a product receiving space 30d of the product receiving unit 20d, and with at least one transfer unit 32d for a product transfer of products 12d between the transport unit 14d and the mover 18d. Viewed in a plane extending at least substantially perpendicularly to a main extension plane of the product receiving unit 20d, the product receiving unit 20d has at least one at least partially open front face 34d. The product receiving unit 20d illustrated in FIGS. 5 and 6 preferably has at least two at least partially open front faces 34d, 70d. One front face 34d of the at least partially open front faces 34d, 70d of the product receiving unit 20d is preferably realized by a non-existence of a sidewall at the front face 34d. The other front face 70d of the at least partially open front faces 34d, 70d is preferably realized by at least one opening of a sidewall 26d that is arranged at the other front face 70d, said opening being delimited by at least two subsections of the sidewall 26d of the product receiving unit 20d. Preferentially the product receiving unit 20d comprises at least three sidewalls 24d, 26d, 28d extending transversally, in particular at least substantially perpendicularly, to the support surface 22d of the product receiving unit 20d, wherein two sidewalls 24d, 28d of the three sidewalls 24d, 26d, 28d are oriented at least substantially parallel to each other and one sidewall 26d of the three sidewalls 24d, 26d, 28d is divided into two subsections and is oriented transversally, in particular at least substantially perpendicularly, to the two sidewalls 24d, 28d of the three sidewalls 24d, 26d, 28d. Viewed in a top view that is at least substantially perpendicular to the support surface 22d and/or to the main extension plane, the three sidewalls 24d, 26d, 28d form two L-shaped edgings of the product receiving space 30d.

The product receiving unit 20d comprises at least one bottom 36d having at least one slot-like or groove-like recess 38d, which is configured for an insertion of at least one transfer element 40d of the transfer unit 32d. The slot-like or groove-like recess 38d extends, starting from the at least partially open front face 34d, at least largely over the entire longitudinal extension of the product receiving unit 20d, in particular as far as the other at least partially open front face 70d.

The product receiving unit 20d comprises at least one ramp element 42d, 44d, which is configured to arrange products 12d in the product receiving space 30d in an inclined fashion. Preferably the ramp element 42d, 44d is oriented at an inclination relative to the bottom 36d. Preferentially the ramp element 42d, 44d is arranged only in a subregion of the product receiving space 30d. The ramp element 42d, 44d is in particular arranged directly adjacent to at least one of the sidewalls 24d, 28d. The ramp element 42d, 44d is preferably arranged laterally offset from the recess 38d. The product receiving unit 20d preferably comprises at least two ramp elements 42d, 44d. The at least two ramp elements 42d, 44d are preferably arranged in the product receiving space 30d mirror-symmetrically to a longitudinal axis of the product receiving unit 20d. It is also conceivable that the at least two ramp elements 42d, 44d have a different arrangement in the product receiving space 30d that is deemed expedient by someone skilled in the art. Preferably the at least two ramp elements 42d, 44d have an at least substantially analogous design. Preferably the two ramp elements 42d, 44d are arranged laterally offset from the recess 38d. In particular, respectively one of the ramp elements 42d, 44d is arranged on each side of the recess 38d. Preferably one of the ramp elements 42d, 44d is arranged offset from the recess 38d to the lefthand side and the other one of the ramp elements 42d, 44d is arranged offset from the recess 38d to the righthand side. The recess 38d is preferably arranged between the two ramp elements 42d, 44d, in particular when viewed along a direction that runs at least substantially perpendicularly to the longitudinal axis of the product receiving unit 20d.

The transfer element 40d is preferably arranged at a transition between the electrodynamic conveying unit 32d and the transport unit 14d, in particular at a transport-away element 52d of the transport unit 14d. The transfer element 40d is preferentially oriented so as to be inclined relative to a transport surface of the transport unit 14d, in particular of the transport-away element 52d. Preferentially the transfer element 40d is embodied as a driveless ramp. Preferably, for a product transfer of at least one product 12d between the transport unit 14d and the mover 18d, in particular from the mover 18d to the transport-away element 52d, the transfer element 40d of the transfer unit 32d is inserted into the slot-like or groove-like recess 38d of the bottom 36d of the product receiving unit 20d. The mover 18d is passed underneath the transfer element 40d in order to transfer the product 12d to the transfer element 40d and to provide the product 12d with an impulse, such that the product 12d is moved upwards along the gradient of the transfer element 40d as far as the transport-away element 52d. For a product transfer of at least one product 12d between the transport unit 14d and the mover 18d, in particular from the mover 18d to the transport-away element 52d, the mover 18d passes underneath the transfer element 40d of the transfer unit 32d.

The transfer unit 32d preferably comprises at least one further transfer element 72d. The further transfer element 72d is configured for a product transfer of at least one product 12d between the transport unit 14d and the mover 18d, in particular from a feed transport element 50d of the transport unit 14d to the mover 18d. The further transfer element 72d is preferably arranged between the transport unit 14d, in particular the feed transport element 50d, and the electrodynamic conveying unit 16d, in particular at an end of the feed transport element 50d. The further transfer element 72d is preferentially embodied as a driveless ramp. The further transfer element 72d may preferably be arranged at the feed transport element 50d so as to be adjustable, in particular with regard to its inclination and/or position. The further transfer element 72d is preferably oriented so as to be inclined relative to a transport surface of the transport unit 14d, in particular of the feed transport element 50d, in particular in order to realize a glide-in of at least one product 12d into the product receiving space 30d during a product transfer from the feed transport element 50d to the mover 18d. A ramp surface of the further transfer element 72d preferably has a parabola-shaped contour. However, it is also conceivable that the ramp-surface has a straight contour. It is moreover conceivable that the transfer unit 32d comprises a plurality of further transfer elements 72d, which are embodied identically or differently. Further features of the handling device 10d and/or of a method for a transfer of products 12d may preferably be taken from the description of FIGS. 1, 2 and 9.

Figure 7:
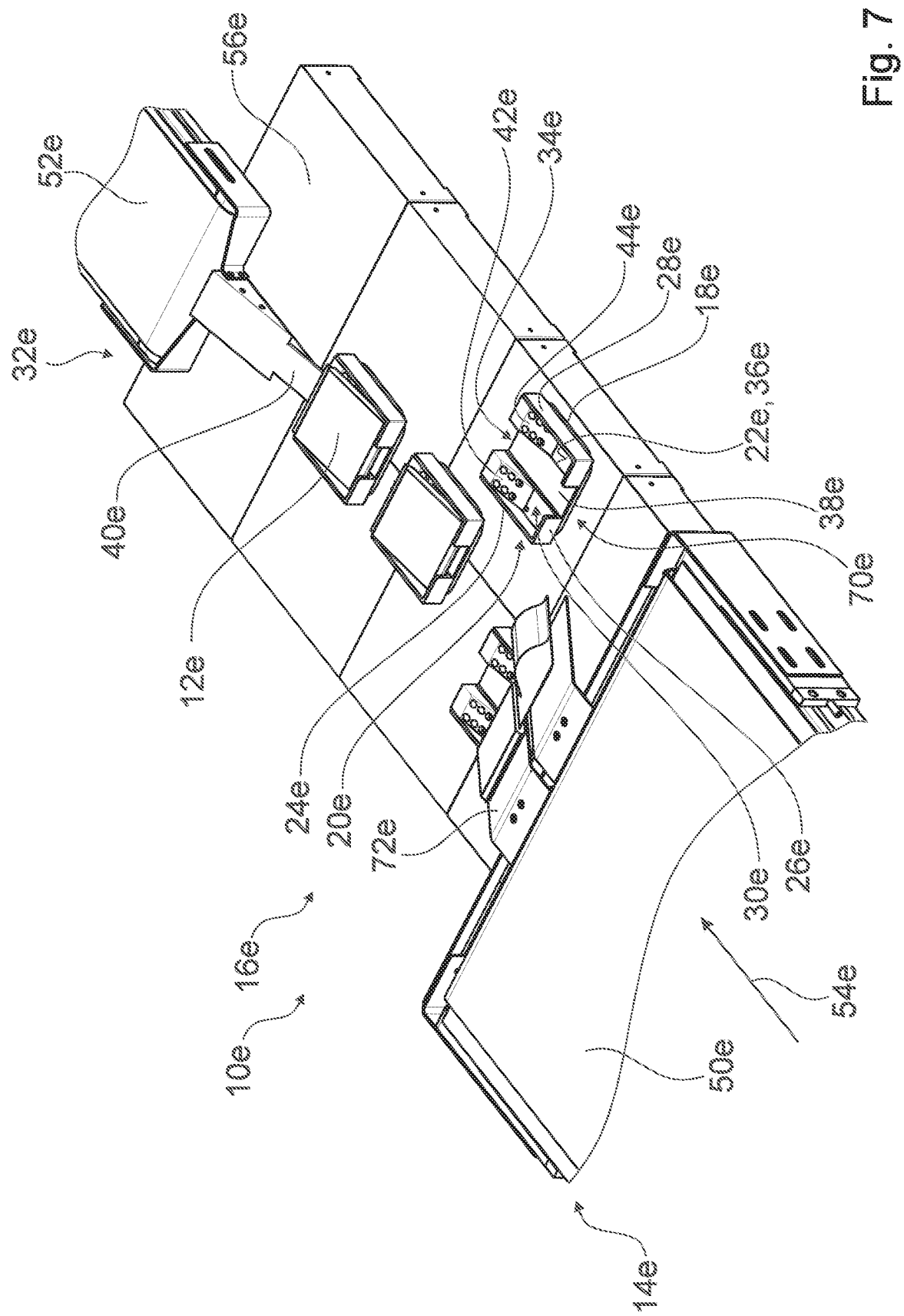

FIG. 7 shows a handling device 10e for a transfer of products 12e, in particular food products, with at least one transport unit 14e, in particular a conveyor belt unit, with at least one electrodynamic conveying unit 16e comprising at least one electrodynamically movable mover 18e and at least one product receiving unit 20e which is arranged at the mover 18e and comprises at least one sidewall 24e, 26e, 28e extending transversally to a support surface 22e of the product receiving unit 20e and at least partially delimiting a product receiving space 30e of the product receiving unit 20e, and with at least one transfer unit 32e for a product transfer of products 12e between the transport unit 14e and the mover 18e. Viewed in a plane extending at least substantially perpendicularly to a main extension plane of the product receiving unit 20e, the product receiving unit 20e has at least one at least partially open front face 34e. The product receiving unit 20e illustrated in FIG. 7 preferentially has at least two at least partially open front faces 34e, 70e. Principally, with regard to the implementation of the handling device 10e illustrated in FIG. 7, the description of FIGS. 5 and 6 may be referred to, which is to be read in analogy onto the handling device 10e illustrated in FIG. 7. Differently than with FIGS. 5 and 6, the transfer unit 32e of the handling device 10e illustrated in FIG. 7 comprises at least one further transfer element 72e having a straight contour, in particular no parabola-shaped contour, of a ramp surface of the further transfer element 72e. Further features of the handling device 10e and/or of a method for a transfer of products 12e may preferably be taken from the description of FIGS. 1, 2 and 9.

Figure 8:
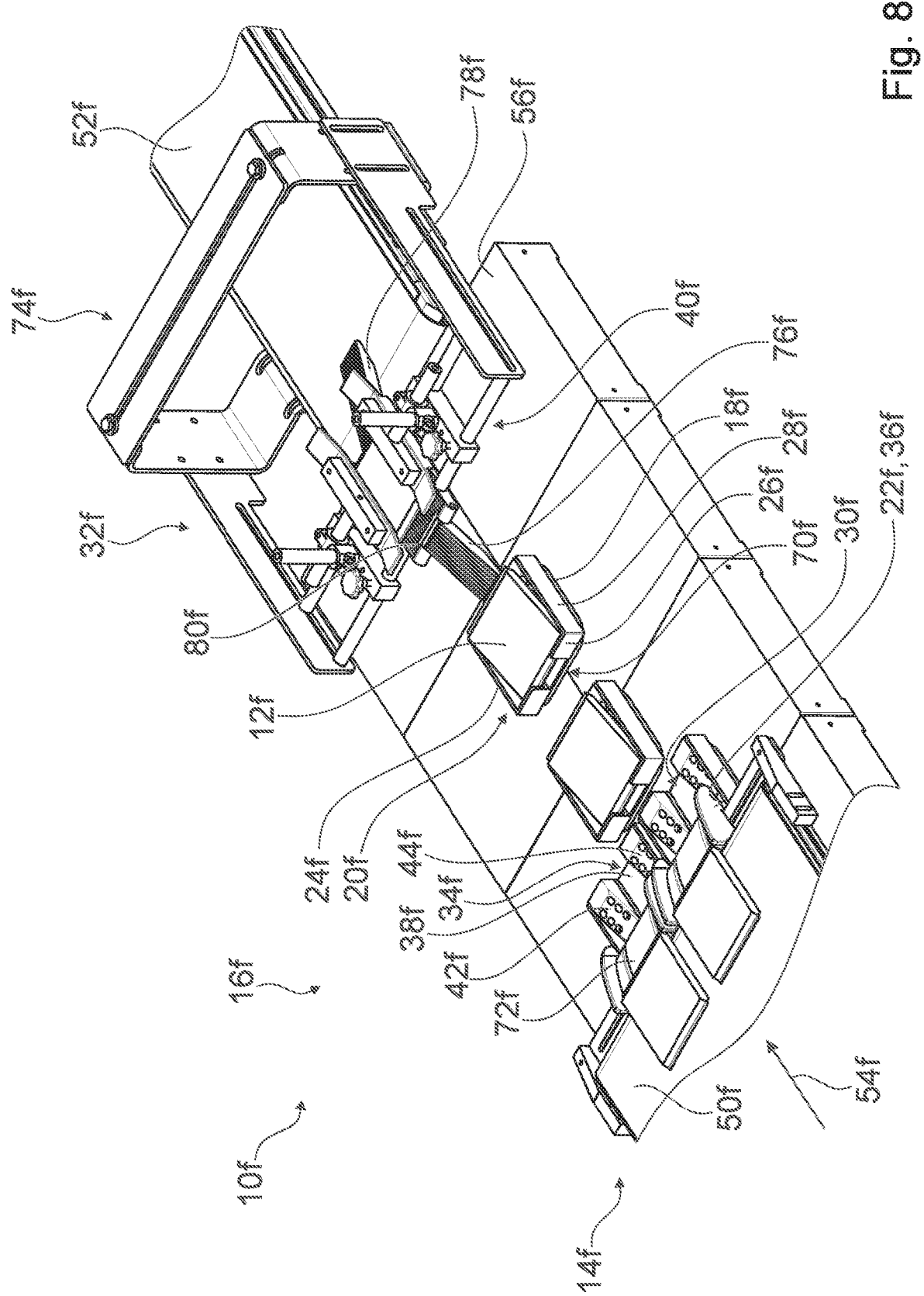

FIG. 8 shows a handling device 10f for a transfer of products 12f, in particular food products, with at least one transport unit 14f, in particular a conveyor belt unit, with at least one electrodynamic conveying unit 16f comprising at least one electrodynamically movable mover 18f and at least one product receiving unit 20f which is arranged at the mover 18f and comprises at least one sidewall 24f, 26f, 28f extending transversally to a support surface 22f of the product receiving unit 20f and at least partially delimiting a product receiving space 30f of the product receiving unit 20f, and with at least one transfer unit 32f for a product transfer of products 12f between the transfer unit 14f and the mover 18f. Viewed in a plane that extends at least substantially perpendicularly to a main extension plane of the product receiving unit 20f, the product receiving unit 20f has at least one at least partially open front face 34f. The product receiving unit 20f illustrated in FIG. 8 preferentially has at least two at least partially open front faces 34f, 70f. Principally, with regard to the implementation of the handling device 10f illustrated in FIG. 8, the description of FIGS. 5 and 6 may be referred to, which is to be read in analogy onto the handling device 10f illustrated in FIG. 8. Differently than with FIGS. 5 and 6, the transfer unit 32f of the handling device 10f illustrated in FIG. 8 comprises at least one transfer element 40f which is adjustable in a vertical and/or in a horizontal position by means of an adjusting unit 74f of the handling device 10f. Preferentially, the transfer element 40f moreover comprises at least two ramp sections 76f, 78f and a conveying section 80f that is situated between the ramp sections 76f, 78f. Preferably the ramp sections 76f, 78f are in each case inclined with respect to a transport surface of the transport unit 14f, in particular of a transport-away element 52f of the transport unit 14f, the ramp sections 76f, 78f being oriented in opposed fashion. The conveying section 80f is preferentially embodied as an endless belt which is drivable in a circulating manner. However, it is also conceivable that the conveying section 80f is realized in a drive-less fashion and the products 12f glide over the conveying section 80f due to an impulse transmitted to the products 12f by the mover 18f. Preferably the conveying section 80f, in particular a conveying surface of the conveying section 80f, is arranged offset—at least substantially parallel—from the transport surface of the transport unit 14f, in particular of the transport-away element 52f. In particular, a vertical distance between the transport surface of the transport unit 14f, in particular of the transport-away element 52f, and the conveying surface of the conveying section 80f is adjustable by means of the adjusting unit 74f. The adjusting unit 74f preferably comprises a frame and adjustment-guiding elements arranged thereon for an adjustment of a vertical and a horizontal position of the transfer element 40f. Further features of the handling device 10f and/or of a method for a transfer of products 12f may preferably be taken from the description of FIGS. 1, 2 and 9.

What is claimed is:

1. A handling device for a transfer of products (12a; 12d; 12e; 12f) comprising:
at least one transport unit (14a; 14b; 14d; 14e; 14f),
at least one electrodynamic conveying unit (16a; 16b; 16c; 16d; 16e; 16f), which comprises at least one electrodynamically movable mover (18a; 18b; 18c; 18d; 18e; 18f) and at least one product receiving unit (20a; 20b; 20c; 20d; 20e; 20f), which is arranged at the mover (18a; 18b; 18c; 18d; 18e; 18f) and has at least one sidewall (24a, 26a, 28a; 24b, 26b, 28b; 24c, 26c, 28c; 24d, 26d, 28d; 24e, 26e, 28e; 24f, 26f, 28f) extending transversally to a support surface (22a; 22b; 22c; 22d; 22e; 22f) of the product receiving unit (20a; 20b; 20c; 20d; 20e; 20f) and at least partially delimiting a product receiving space (30a; 30b; 30c; 30d; 30e; 30f) of the product receiving unit (20a; 20b; 20c; 20d; 20e; 20f), and
at least one transfer unit (32a; 32b; 32c; 32d; 32e; 32f) for a product transfer of products (12a; 12d; 12e; 12f) between the transport unit (14a; 14b; 14d; 14e; 14f) and the mover (18a; 18b; 18c; 18d; 18e; 18f),
wherein viewed in a plane extending at least substantially perpendicularly to a main extension plane of the product receiving unit (20a; 20b; 20c; 20d; 20e; 20f), the product receiving unit (20a; 20b; 20c; 20d; 20e; 20f) has at least one front face (34a; 34b; 34c; 34d; 34e; 34f) that is at least partially open, and
wherein the product receiving unit (20d; 20e; 20f) further comprises at least one ramp element (42d, 44d; 42e, 44e; 42f, 44f), which is configured to support products (12d; 12e; 12f) thereon in the product receiving space (30d; 30e; 30f) in an inclined fashion.

2. The handling device according to claim 1, wherein the product receiving unit (20a; 20b; 20c; 20d; 20e; 20f) further comprises at least one bottom (36a; 36b; 36c; 36d; 36e; 36f), which has at least one slot-like or groove-like recess (38a; 38b; 38c; 38d; 38e; 38f) that is configured for an insertion of at least one transfer element (40b; 40c; 40d; 40e; 40f) of the transfer unit (32b; 32c; 32d; 32e; 32f) or for influencing a friction between a product (12a) arranged in the product receiving unit (20a) and the bottom (36a) of the product receiving unit (20a).

3. The handling device according to claim 1, wherein the product receiving unit (20a; 20b; 20c; 20d; 20e; 20f) further comprises at least one bottom (36a; 36b; 36c; 36d; 36e; 36f), which has at least one slot-like or groove-like recess (38a; 38b; 38c; 38d; 38e; 38f) extending from the at least partially open front face (34a; 34b; 34c; 34d; 34e; 34f) at least largely over an entire longitudinal extension of the product receiving unit (20a; 20b; 20c; 20d; 20e; 20f).

4. The handling device according to claim 1, wherein the product receiving unit (20d; 20e; 20f) further comprises at least one bottom (36d; 36e; 36f) having at least one slot-like or groove-like recess (38d; 38e; 38f), and the at least one ramp element (42d, 44d; 42e, 44e; 42f, 44f) is arranged laterally offset from the recess (38d; 38e; 38f).

5. The handling device according to claim 1, further comprising at least one control or regulation unit (46a; 46b), which is formed at least partially integrally with the transfer unit (32a; 32b) and is configured to control or regulate an acceleration characteristic of the mover (18a; 18b) in such a way that a product transfer of products (12a) between the transport unit (14a; 14b) and the mover (18a; 18b) can be carried out depending on a change in the acceleration characteristic.

6. A production machine with at least one handling device according to claim 1.

7. A mover (18a; 18b; 18c; 18d; 18e; 18f) with a product receiving unit (20a; 20b; 20c; 20d; 20e; 20f) for a handling device according to claim 1, which is arranged on the mover (18a; 18b; 18c; 18d; 18e; 18f).

8. A method for a transfer of products (12a; 12d; 12e; 12f) by a handling device according to claim 1, wherein for a product transfer of at least one product (12a; 12d; 12e; 12f) between the transport unit (14a; 14b; 14d; 14e; 14f) and the mover (18a; 18b; 18c; 18d; 18e; 18f), the product (12a; 12d; 12e; 12f) is conveyed out of the product receiving space (30a; 30b; 30c; 30d; 30e; 30f) via the open front face (34a; 34b; 34c; 34d; 34e; 34f).

9. The method according to claim 8, wherein a product transfer of at least one product (12a; 12d; 12e; 12f) between the transport unit (14a; 14b) and the mover (18a; 18b) is carried out depending on a change in an acceleration characteristic of the mover (18a; 18b).

10. The method according to claim 8, wherein for a product transfer of at least one product (12d; 12e; 12f) between the transport unit (14b; 14d; 14e; 14f) and the mover (18b; 18c; 18d; 18e; 18f), at least one transfer element (40b; 40c; 40d; 40e; 40f) of the transfer unit (32b; 32c; 32d; 32e; 32f) is inserted into a slot-like or groove-like recess (38b; 38c; 38d; 38e; 38f) of a bottom (36b; 36c; 36d; 36e; 36f) of the product receiving unit (20b; 20c; 20d; 20e; 20f).

11. The method according to claim 8, wherein for a product transfer of at least one product (12d; 12e; 12f) between the transport unit (14b; 14d; 14e; 14f) and the mover (18b; 18c; 18d; 18e; 18f), the mover (18b; 18c; 18d; 18e; 18f) passes under at least one transfer element (40b; 40c; 40d; 40e; 40f) of the transfer unit (32b; 32c; 32d; 32e; 32f).

12. A handling device for a transfer of products (12a; 12d; 12e; 12f) comprising:
at least one transport unit (14a; 14b; 14d; 14e; 14f),
at least one electrodynamic conveying unit (16a; 16b; 16c; 16d; 16e; 16f), which comprises at least one electrodynamically movable mover (18*a*; 18*b*; 18*c*; 18*d*; 18*e*; 18*f*) and at least one product receiving unit (20*a*; 20*b*; 20*c*; 20*d*; 20*e*; 20*f*), which is arranged at the mover (18*a*; 18*b*; 18*c*; 18*d*; 18*e*; 18*f*) and has at least one sidewall (24*a*, 26*a*, 28*a*; 24*b*, 26*b*, 28*b*; 24*c*, 26*c*, 28*c*; 24*d*, 26*d*, 28*d*; 24*e*, 26*e*, 28*e*; 24*f*, 26*f*, 28*f*) extending transversally to a support surface (22*a*; 22*b*; 22*c*; 22*d*; 22*e*; 22*f*) of the product receiving unit (20*a*; 20*b*; 20*c*; 20*d*; 20*e*; 20*f*) and at least partially delimiting a product receiving space (30*a*; 30*b*; 30*c*; 30*d*; 30*e*; 30*f*) of the product receiving unit (20*a*; 20*b*; 20*c*; 20*d*; 20*e*; 20*f*), and at least one transfer unit (32*a*; 32*b*; 32*c*; 32*d*; 32*e*; 32*f*) for a product transfer of products (12*a*; 12*d*; 12*e*; 12*f*) between the transport unit (14*a*; 14*b*; 14*d*; 14*e*; 14*f*) and the mover (18*a*; 18*b*; 18*c*; 18*d*; 18*e*; 18*f*), wherein viewed in a plane extending at least substantially perpendicularly to a main extension plane of the product receiving unit (20*a*; 20*b*; 20*c*; 20*d*; 20*e*; 20*f*), the product receiving unit (20*a*; 20*b*; 20*c*; 20*d*; 20*e*; 20*f*) has at least one front face (34*a*; 34*b*; 34*c*; 34*d*; 34*e*; 34*f*) that is at least partially open, and wherein the handling device further comprises at least one control or regulation unit (46*a*; 46*b*), which is formed at least partially integrally with the transfer unit (32*a*; 32*b*) and is configured to control or regulate an acceleration characteristic of the mover (18*a*; 18*b*) in such a way that a product transfer of products (12*a*) between the transport unit (14*a*; 14*b*) and the mover (18*a*; 18*b*) can be carried out depending on a change in the acceleration characteristic.

13. A method for a transfer of products (12*a*; 12*d*; 12*e*; 12*f*) by a handling device comprising:

at least one transport unit (14*a*; 14*b*; 14*d*; 14*e*; 14*f*), at least one electrodynamic conveying unit (16*a*; 16*b*; 16*c*; 16*d*; 16*e*; 16*f*), which comprises at least one electrodynamically movable mover (18*a*; 18*b*; 18*c*; 18*d*; 18*e*; 18*f*) and at least one product receiving unit (20*a*; 20*b*; 20*c*; 20*d*; 20*e*; 20*f*), which is arranged at the mover (18*a*; 18*b*; 18*c*; 18*d*; 18*e*; 18*f*) and has at least one sidewall (24*a*, 26*a*, 28*a*; 24*b*, 26*b*, 28*b*; 24*c*, 26*c*, 28*c*; 24*d*, 26*d*, 28*d*; 24*e*, 26*e*, 28*e*; 24*f*, 26*f*, 28*f*) extending transversally to a support surface (22*a*; 22*b*; 22*c*; 22*d*; 22*e*; 22*f*) of the product receiving unit (20*a*; 20*b*; 20*c*; 20*d*; 20*e*; 20*f*) and at least partially delimiting a product receiving space (30*a*; 30*b*; 30*c*; 30*d*; 30*e*; 30*f*) of the product receiving unit (20*a*; 20*b*; 20*c*; 20*d*; 20*e*; 20*f*), and at least one transfer unit (32*a*; 32*b*; 32*c*; 32*d*; 32*e*; 32*f*) for a product transfer of products (12*a*; 12*d*; 12*e*; 12*f*) between the transport unit (14*a*; 14*b*; 14*d*; 14*e*; 14*f*) and the mover (18*a*; 18*b*; 18*c*; 18*d*; 18*e*; 18*f*), wherein viewed in a plane extending at least substantially perpendicularly to a main extension plane of the product receiving unit (20*a*; 20*b*; 20*c*; 20*d*; 20*e*; 20*f*), the product receiving unit (20*a*; 20*b*; 20*c*; 20*d*; 20*e*; 20*f*) has at least one front face (34*a*; 34*b*; 34*c*; 34*d*; 34*e*; 34*f*) that is at least partially open, wherein for a product transfer of at least one product (12*a*; 12*d*; 12*e*; 12*f*) between the transport unit (14*a*; 14*b*; 14*d*; 14*e*; 14*f*) and the mover (18*a*; 18*b*; 18*c*; 18*d*; 18*e*; 18*f*), the product (12*a*; 12*d*; 12*e*; 12*f*) is conveyed out of the product receiving space (30*a*; 30*b*; 30*c*; 30*d*; 30*e*; 30*f*) via the open front face (34*a*; 34*b*; 34*c*; 34*d*; 34*e*; 34*f*), and wherein a product transfer of at least one product (12*a*; 12*d*; 12*e*; 12*f*) between the transport unit (14*a*; 14*b*) and the mover (18*a*; 18*b*) is carried out depending on a change in an acceleration characteristic of the mover (18*a*; 18*b*).

\* \* \* \* \*